April 29, 1941.　　　　D. M. WEIGEL　　　　2,240,359

CLUTCH

Filed Feb. 11, 1939　　　2 Sheets-Sheet 1

INVENTOR.
DANIEL M. WEIGEL
BY Richey & Watts
ATTORNEYS

April 29, 1941.                     D. M. WEIGEL                     2,240,359
                                      CLUTCH
                              Filed Feb. 11, 1939              2 Sheets-Sheet 2

INVENTOR.
DANIEL M. WEIGEL
BY
Richey & Watts
ATTORNEYS

Patented Apr. 29, 1941

2,240,359

UNITED STATES PATENT OFFICE 2,240,359

CLUTCH

Daniel Michel Weigel, Cleveland, Ohio

Application February 11, 1939, Serial No. 255,936

14 Claims. (Cl. 192—45.1)

This invention relates to clutches and more particularly to a clutch of the "overrunning" or uni-directional type, and is a continuation in part of my copending application for clutch, Serial No. 122,813, filed January 28, 1937. It is among the objects of my invention to provide an overrunning clutch which will be simple and sturdy in construction, efficient in operation and will be characterized by a smooth engaging and disengaging action free of "back lash" or slippage. It is a further object of my invention to provide an overrunning clutch which will distribute the force of drive from the driving member to the driven member over a greater bearing area than prior art clutches provided for this purpose and which will result in lower unit bearing pressures than said prior art clutches. It is a further object of my invention to provide an overrunning clutch according to the preceding object which will have a long useful life and in which the wearing parts are shaped to automatically compensate for the wear occasioned by use. It is still another object of the invention to provide a device of the class described wherein the wearing parts are so designed that they all provide equal engagement between the driving and driven surfaces throughout their life and that the design is further such that the useful life is materially increased over the prior device. Further objects and advantages relating to smoothness of action, efficiency of operation and economy of manufacture will appear from the following description and the appended drawings in which:

Generally speaking, I have attained the objects above outlined by replacing the ball or roller construction of a conventional overrunning clutch with a mechanism including a series of plates or pawls pivoted on one portion of the clutch and arranged to bear against a smooth face on another portion of the clutch to transmit the force of drive from one of said portions to the other.

Figure 1:
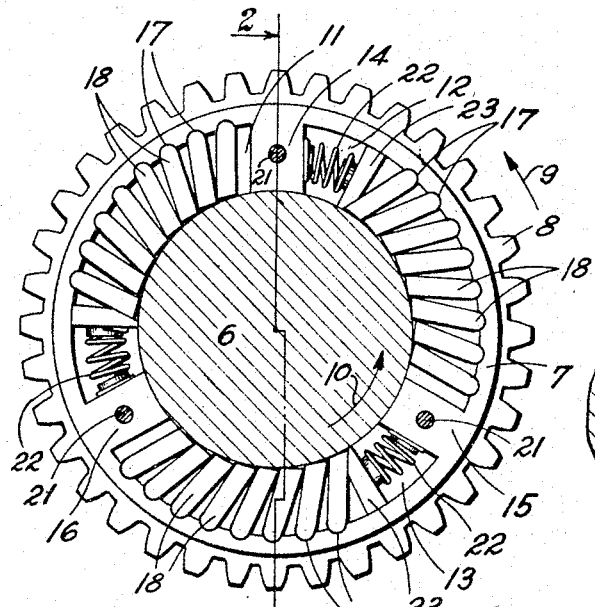
Figure 1 is an elevation taken along line 1—1 of Figure 2 of a clutch constructed according to my invention.
Figure 2:
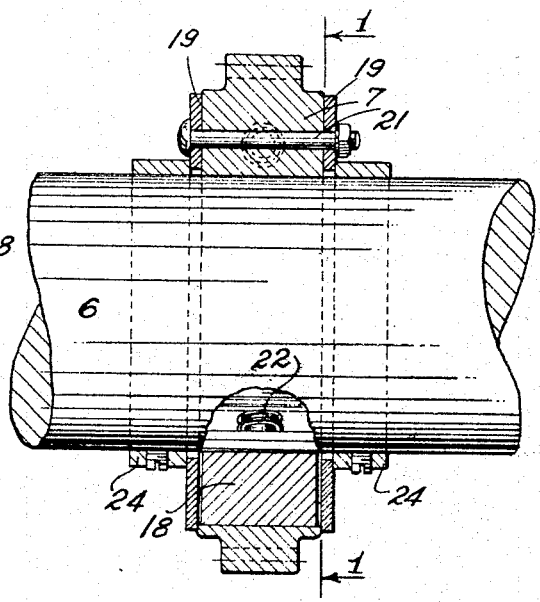
Figure 2 is a view taken at right angles to the elevation of Figure 1 with parts in section along the line 2—2 of Figure 1.

More specifically, the invention comprises in the embodiment shown in Figures 1 and 2, a shaft 6 which, for convenience of description, will be referred to as the driven shaft and a gear 7 which will be referred to as the driving member of the clutch. The gear 7 is provided with gear teeth 8 which are arranged to mesh with a driving spur gear or the like (not shown) and rotate the gear in the direction indicated by the arrow 9. The gear 7 is cut away at its interior to provide segmental compartments 11, 12 and 13 which are spaced from each other by inwardly extending spokes or lugs 14, 15 and 16. The inner ends of said lugs 14—15—16 are curved to provide bearing surfaces in contact with the shaft 6 and rotatably support said gear on said shaft. The outer walls of the segmental compartments 11, 12, 13 are grooved in the direction of the axis of the shaft 6 as at 17 to provide bearing seats for a plurality of plates or pawls 18. The pawls 18 are retained within the segmental compartments 11—12—13 by cover rings 19 secured to the gear by spaced fasteners 21.

The length of the pawls 18 slightly exceeds the radial distance from the compartment wall on which they are pivoted to the shaft so that the pawls are normally inclined with respect to the shaft and arranged in intimate contact with each other as shown. In this connection I have found that the angular deviation of the pawls 18 from a line normal to the engaged surface may be up to about 20°. The inner or shaft bearing end of each pawl is preferably bevelled with respect to the body of the pawl so that as that portion of the end face in driving contact with the shaft is worn away an immediately adjacent end face portion will be brought into operative load bearing contact with the shaft. The pawls or plates 18 are normally urged into engagement with the shaft by the springs 22 which are arranged between the members 14—15—16 and an adjacent series of plates or pawls 18. The expansive effect of the spring 22 is transmitted through the block 23 to the end pawl 18 of the series and the remaining pawls then in turn transmit the spring effect successively to each other.

In that form of my invention shown in Figures 1 and 2 the pawls 18 are arranged substantially as shown with respect to the shaft 6, and during that phase of the clutch operation when the gear 7 is turned in the direction indicated by the arrow 9, the pawls have a slight tilting movement. This movement is so limited that practically no angular movement occurs between the driving and driven clutch parts during engagement. This smooth engaging action results from the fact that the end face of the pawl is constantly bearing against the shaft. The limited tilting movement is the result of the combined effect of the inertia of the pawl and the urging of the spring. In the event that the shaft 6 is turning faster in the direction of the arrow 10 than the gear 7 is being driven as indicated at 9, the shaft "overruns" the pawls 18 and they are tilted out of a driving engagement with the shaft by the frictional pull at the surface of the shaft in the direction of the arrow 10. It will be understood, however, that the tilting movement of the pawls as referred to here is practically imperceptible and is so limited that the "back lash" or slack take-up which has heretofore characterized clutches of the "overrunning" type is eliminated.

It will be observed that the total force of drive is equally distributed through a large number of closely spaced pawls and thus the force of drive is distributed over a large area of the shaft and the unit bearing pressure proportionately reduced. Among the advantages flowing from this construction is that the unit bearing pressure may be reduced to a point where the force of drive transmitted through each pawl is well within the elastic limit of the metals available for such mechanism and thus all tendency for the pawls to bite or permanently deform the surface of the driven part is eliminated. Persons familiar with the prior art constructions which include balls or rollers in engagement with the driven part of the clutch will appreciate that the force of drive is transmitted in said prior art constructions by a single point contact in the case of the ball clutch and a single line contact in the case of the roller clutch and that such point or line contacts must be spaced from each other the diameter of the ball or the roller.

Figure 3:
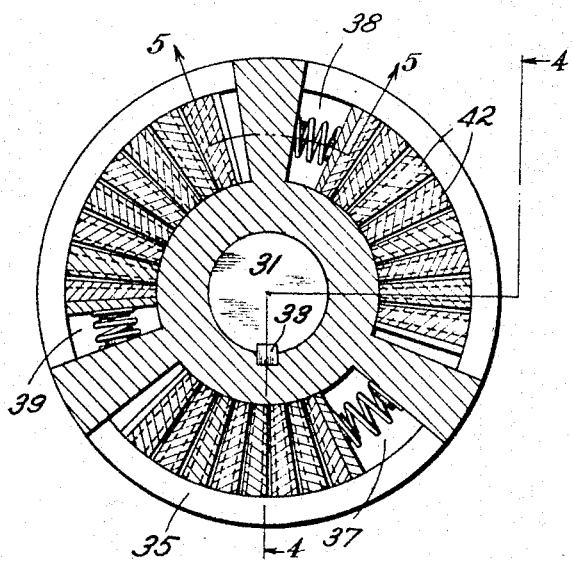
Figure 3 is a sectional view taken on the line 3—3 of Figure 4 showing a modified form of my invention.
Figure 4:
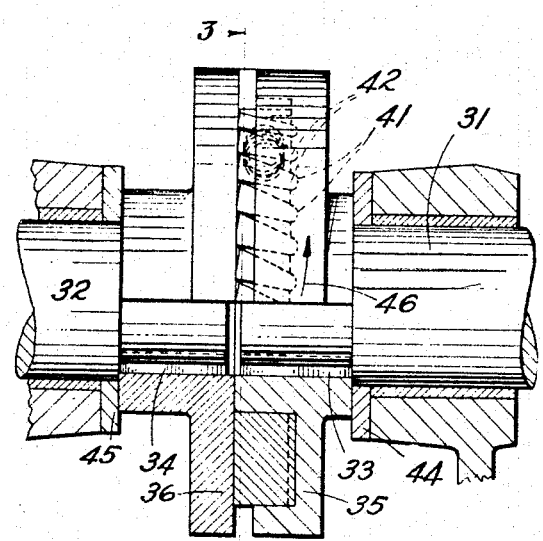
Figure 4 is a side elevation of the form shown in Figure 3 with parts in section (according to line 4—4 of Figure 3)
Figure 5:
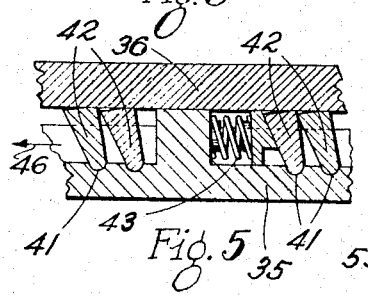
Figure 5 is a partial sectional view taken along the line 5—5 of Figure 3.

The overrunning clutch of my invention is also suited to the transmission of a drive between parallel flat surfaces and I have shown in Figures 3 to 5 inclusive an embodiment of this type. A pair of aligned shafts 31 and 32 hereinafter referred to as driving and driven shafts, respectively, are arranged in an end-to-end relation and have keyed thereon as at 33 and 34 driving and driven disc bodies 35 and 36. The driving disc body 35 is provided with spaced segmental compartments 37, 38 and 39, each of which is grooved radially as at 41 to provide pivoting grooves for radially extending pawls or plates 42. The pawls 42 are bevelled at their forward face and are urged into gripping engagement with the driven disc 36 by springs 43 functioning as described in connection with the first embodiment.

The driving and driven discs of the clutch are normally maintained in operative relation as shown in Figure 4 by thrust bearings 44 and 45, and when the driving disc is rotated in the direction indicated by arrow 46 the pawls 42 will bear against the face of the driven disc 36 and rotate the same therewith. In this embodiment, as in the embodiment first described, the tilting of the pawls from an inoperative, non-driving relation is so limited as to eliminate back lash or slack in the clutch. This embodiment of my invention also provides the advantages of a large number of load bearing driving surfaces and the consequent reduction of unit pressures due to force of drive.

Figure 6:
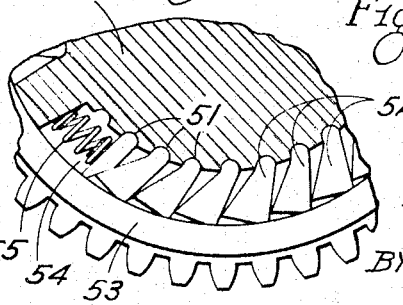
Figure 6 is a sectional view illustrating a further modification of a clutch according to my invention.

Referring to Figure 6 I have shown a form of my invention suited for use in connection with a shaft and a surrounding gear or the like somewhat such as illustrated in Figure 1. The embodiment of Figure 6 includes a shaft 50 which will be referred to as the driving shaft of the clutch and is provided with grooves 51 extending parallel to the axis of the shaft to pivotally support a series of pawls 52 arranged to bear at their outer ends on the inner periphery of the driven part of the clutch 53. The pawls or plates 52 are arranged within spaced segmental compartments 54 and are resiliently urged into contact with the driven clutch part 53 by the spring 55 substantially as described in connection with the embodiment of Figure 1. The form of my invention shown in Figure 6 is suited for installations where the maximum bearing area is desired for contact with the pivoted pawls, since the inner periphery of the gear 53 exceeds the periphery of the shaft.

Figure 7:
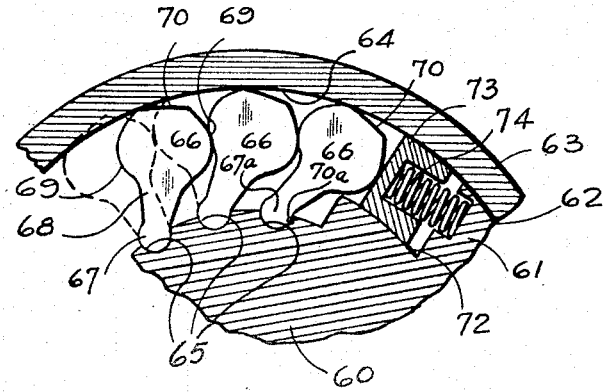
Figure 7 is a fragmentary enlarged elevational view similar to that of Figure 6, but showing a modified form of pawls.
Figure 8:
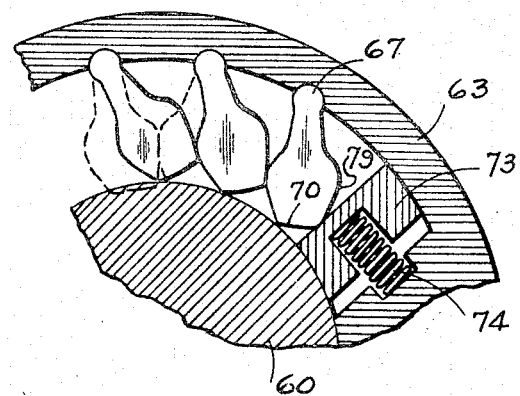
Figure 8 is a fragmentary view similar to that of Figure 1 showing the modified form of pawl.
Figure 9:
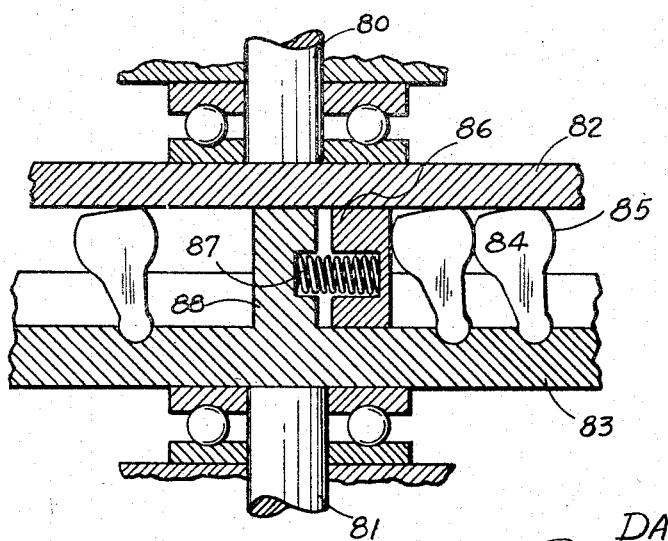
Figure 9 shows the modified type of pawl as substituted for those of Figure 5, being a developed sectional view of a fragmentary clutch for end-to-end engagement.

In Figs. 7, 8 and 9 I have illustrated a mechanism, on a slightly enlarged scale similar to Figs. 6, 1 and 5 respectively, but wherein a modified and preferred form of pawl is employed. This improved type of pawl is such that equal engagement of the pawls is had with the driven member and as wear occurs it occurs equally with all the pawls and the life of the mechanism is thus materially extended.

In the embodiment shown in Figure 7, a member 63 such as a gear, and which may be the driven member, is provided with a smooth cylindrical inner wall 64 for engagement with the pawls. The driving member such as the shaft 60 is provided with equally spaced radially extending members or spokes 61. The spokes 61 have their extremities curved at 62 and thus provide a supporting and bearing surface for the gear 63, the curved ends conforming to the inner wall 64. The spokes 6 thus provide a plurality of compartments spaced about the interior of the gear similar to those shown in Fig. 1.

The surface of the shaft is provided with a plurality of spaced grooves 65, extending parallel to the shaft axis, and in which are seated the pawls 66. Each pawl comprises a substantially cylindrical base 67 seated and adapted to turn in the groove 65, and having a stem 68 extending therefrom, which stem terminates in the body 66.

The body of each pawl is provided with curved sides 69 which are so designed that the pawls always have contact with each other and the angle of inclination of all of the pawls in relation to a radial line extending from the axis of the pawl to the center of the shaft is the same regardless of the angular position of the pawls during operation.

The ends of the pawls are also curved at 70, being preferably arcs described from a center 70a which is spaced from the center 67a, being the center of rotation of the supported end of the pawl. Each of the spokes or supports 61 is provided with a slideway 72 in which is slidably disposed a pressure block 73, one face of which engages the end-most pawl and the other end of which abuts the end of a helical spring 74 disposed between the block and the end of the slideway.

The pressure block urges the pawls in a direction to wedge the same between the shaft 60 and the member 63, causing any tendency of the two parts to rotate relatively in one direction to be instantly halted by the wedging action of the cam surfaces 70 against the surface 64, while permitting relative rotation or overrunning in the opposite direction in a manner substantially as described for the other embodiments.

It is to be particularly noted, however, that the pressure from the pressure block 73 is transmitted from that block to the adjacent pawl and then to the other pawls by their contacts with each other. This pressure is such that each of the pawls is rotated about its pivot and all of the clutching faces brought into engagement with the outer member with equal pressure. With the curved sides as shown the pawls always remain in contact with each other throughout their serviceable life and at all times maintain the same angle of attack of all of the friction surfaces 70 to the surface 64. In the embodiment illustrated in Fig. 7, the curved sides 69 are substantially elliptical, and in any event are designed for any particular size of clutch so that the pawls intimately contact each other and the surface 64 while making the same angle to the radius, and retain this relationship as wear occurs.

Figure 8 shows pawls of the general design of Fig. 7 applied with their contact faces for engagement with the periphery of the shaft. The pawls are of substantially the same construction as described except that obviously the curved faces 79 are of a slightly different configuration.

In each of Figures 7 and 8 the pawls are illustrated in full lines in the positions they would desirably occupy when the clutch is new and two of the pawls are likewise illustrated in dotted lines in substantially radial positions. These dotted line positions illustrate the limit of the useful life of the clutch as the engaging surfaces of the pawls wear away from use. It will be apparent that as soon as wear occurs at the contact points of the pawls with the relatively rotatable member, the pawls in their engaging positions will approach closer to a radial position. When sufficient wear has occurred to permit the pawls to assume exact radial positions the gripping ability of the clutch will have been lost. Thus the full line position of the pawls and the dotted line positions in Figures 7 and 8 represent the approximate extremes of inclination of the pawls throughout their life. By reason of the configuration of the contacting surfaces of the pawls, the pawls remain in contact with each other and all of the pawls engage the cooperating surfaces at their free ends at the same angle throughout the life of the pawls.

The ends 67 of the pawls are seated in grooves in the outer member 63 and the faces 70 engage the periphery of the shaft 60. The same comments relative to the attack angle remaining the same throughout the life of the device, applies.

Figure 9 shows a developed sectional view of the device where opposing shafts 80 and 81 are coupled together. In this instance the plates 82 and 83 which are secured to the ends of the shafts 80 and 81 are of similar nature and construction to those of Figures 4 and 5, the only difference being that the improved pawls 84 are provided, these pawls having curved sides 85 for the same purposes as those of the embodiments of Figures 7 and 8. The follower, a pressure block 86, engages the pawls, a spring 87 being interposed between the pressure block and abutment 88.

It will be understood by those familiar with clutches of the overrunning or uni-directional type that the terms "driving" and "driven" as used herein are not limited to the particular members referred to inasmuch as all of the clutches shown and described are reversible in drive and that the part herein referred to as the driven part may become the driving part providing the direction of rotation is also reversed.

Although I have shown and described several embodiments of my invention in considerable detail, it will be understood by those skilled in the art that numerous variations may be made therein without departing from the scope of the invention as defined by the following claims.

I claim:

1. An overrunning clutch including a driving and a driven member, means for supporting said members in spaced relation to each other, friction means for providing a driving connection between said members and including a plurality of pawls pivoted to one of said members at spaced points from each other and frictionally engaging a smooth surface on the other of said members, said pawls having contact faces in engagement with each other, said contact faces being so curved that all of said pawls make the same angle with said smooth surface.

2. An overrunning clutch including a driving and a driven member, means for supporting said members in spaced relation to each other, friction means for providing a driving connection between said members and including a plurality of pawls connected to one of said members at spaced points from each other and having contact faces for engagement with each other so arranged that each pawl has equal angular engagement with the other member.

3. An overrunning clutch including a driving and a driven member, abutments carried by one of said members in spaced relation to each other and supporting and spacing the members in fixed relation to each other, driving pawls disposed in the space between the members and formed to have pivotal connection with one of said members and frictional connection with the other, said pawls being provided with contact faces therebetween so arranged that each pawl is held in equal angular contact with the other pawls and equal engagement of the friction faces is provided with one of the members and means for engaging the end pawls to pivot said pawls in a direction counter to that of rotation of said members.

4. An overrunning clutch including a driving and a driven member, abutments carried by one of said members and supporting and spacing said other member, said abutments also defining the ends of pawl receiving pockets between said members, a series of pawls in said pockets one of said members being formed to provide sockets for said pawls and the other of said members having a smooth friction surface for engagement with said pawls, said pawls being pivotally seated in said sockets and extending toward said other member, each of said pawls being provided with opposed curved contact surfaces adapted to provide sliding engagement of the pawls with each other, the curvature of said surfaces being such that when the pawls are in contact with each other the angle of attack and the pivotal angle of said pawls is equal for each pawl and resilient means carried by said abutments for urging the pawls in a direction counter to that of rotation of the members.

5. An overrunning clutch comprising a driving member and a driven shaft, said driving member arranged to surround said shaft and provided with spaced segmental compartments, axially extending grooves formed in a wall of each of said compartments, and a pawl having a rounded end pivotally supported in each of said grooves, the free end of said pawl having a smooth surface in bearing engagement with a smooth periphery on said shaft, a side portion of each of said pawls adjacent said free end arranged to bear against an adjacent pawl, the length of each of said pawls exceeding the distance from its point of pivotal support at its groove to the periphery of the shaft whereby the pawl is disposed at an angle with respect to a tangent at the point of pawl-to-shaft engagement.

6. An overrunning clutch comprising a driving member and a driven shaft, said driving member arranged to surround said shaft and provided with spaced segmental compartments, axially extending grooves formed in a wall of each of said compartments, and a pawl having a rounded end pivotally supported in each of said grooves, the free end of said pawl having a smooth surface in bearing engagement with a smooth periphery on said shaft, a side portion of each of said pawls adjacent said free end arranged to bear against an adjacent pawl, the length of each of said pawls exceeding the distance from its point of pivotal support at its groove to the periphery of the shaft whereby the pawl is disposed at an angle with respect to a tangent at the point of pawl-to-shaft engagement, and spring means within said compartment arranged to resiliently urge the pawls thereof into engagement with said shaft.

7. An overrunning clutch comprising a driving member and a driven shaft, said driving member arranged to surround said shaft and provided with spaced segmental compartments, axially extending grooves formed in a wall of each of said compartments, and a pawl having a rounded end pivotally supported in each of said grooves, the free end of said pawl having a smooth surface in bearing engagement with a smooth periphery on said shaft, a side portion of each of said pawls adjacent said free end arranged to bear against an adjacent pawl, said side portion being curved to maintain the center lines of the pawls at the same angle with each other during engagement, the length of each of said pawls exceeding the distance from its point of pivotal support at its groove to the periphery of the shaft whereby each pawl is disposed at the same angle with respect to a tangent at the point of pawl-to-shaft engagement.

8. An overrunning clutch comprising driving and driven discs arranged in opposed relation and spaced slightly from each other, one of said discs cut away to provide spaced circumferentially extending compartments opening towards said other disc, the radial wall of said compartments provided with radially extending bearing grooves and a plurality of overlapping contacting pawls arranged in said compartment and proportioned to extend into bearing engagement with said other disc, spring means mounted in a wall of each of said compartments arranged to bear against one of said pawls and urge the assembly of pawls within said compartment into bearing engagement with said other disc.

9. An overrunning clutch comprising a driving member and a driven member, one of said members provided with spaced segmental compartments, grooves formed in a wall of each of said compartments, and a pawl having a rounded end pivotally supported in each of said grooves, the free end of each pawl being disposed in bearing engagement with a smooth surface on the other of said members, a side portion of each of said pawls adjacent its free end arranged to bear against a side portion of an adjacent pawl, the length of each of said pawls exceeding the distance from its point of pivotal support to said smooth surface on the other of said members.

10. An overrunning clutch comprising a driving member and a driven member, one of said members provided with spaced segmental compartments, grooves formed in a wall of each of said compartments, and a pawl having a rounded end pivotally supported in each of said grooves, the free end of each pawl being disposed in bearing engagement with a smooth surface on the other of said members, a side portion of each of said pawls being curved adjacent its free end and arranged to bear against a side portion of an adjacent pawl, the curvature being such that the center lines through the pawls are at the same angle to each throughout the various angles of inclination thereof, the length of each of said pawls exceeding the distance from its point of pivotal support to said smooth surface on the other of said members.

11. An overrunning clutch comprising a driving member and a driven member, one of said members provided with a plurality of spaced grooves arranged in a circle, a pawl having a rounded end pivotally supported in each of said grooves, the free end of each pawl being disposed in bearing engagement with a smooth surface on the other of said members, a side portion of each of said pawls adjacent its free end being arranged to bear against a side portion of an adjacent pawl, the length of each of said pawls exceeding the distance from its point of pivotal support to said smooth surface on the other of said members.

12. An overrunning clutch comprising a driving member and a driven member, one of said members comprising a shaft having a plurality of axially extending grooves formed about its periphery, a pawl having a rounded end pivotally supported in each of said grooves, the free end of each pawl being arranged to engage a smooth surface on the other of said members, a side portion of each of said pawls adjacent its free end arranged to bear against an adjacent pawl, the length of each of said pawls exceeding the distance from its point of pivotal support to said smooth surface on the other of said members.

13. An overrunning clutch comprising a driving member and a driven member, one of said members provided with a plurality of spaced grooves arranged in a circle, a pawl having a rounded end pivotally supported in each of said grooves, the free end of each pawl being disposed in bearing engagement with a smooth surface on the other of said members, a side portion of each of said pawls adjacent its free end being curved and arranged to bear against a side portion of an adjacent pawl, the curvature maintaining the pawls with equal bearing engagement with each other and said smooth surface, the length of each of said pawls exceeding the distance from its point of pivotal support to said smooth surface on the other of said members.

14. An overrunning clutch comprising a driving member and a driven member, one of said members comprising a shaft having a plurality of axially extending grooves formed about its periphery, a pawl having a rounded end pivotally supported in each of said grooves, the free end of each pawl being arranged to engage a smooth surface on the other of said members, a side portion of each of said pawls adjacent its free end being formed to provide a cam surface arranged to bear against an adjacent pawl and to maintain each of the pawls with equal engagement with said smooth surface throughout the life of the pawl, the length of each of said pawls exceeding the distance from its point of pivotal support to said smooth surface on the other of said members.

DANIEL MICHEL WEIGEL.